US012788663B2

(12) United States Patent
Vouga et al.

(10) Patent No.: US 12,788,663 B2
(45) Date of Patent: Nov. 10, 2026

(54) BIO-INSPIRED STANDING BALANCE CONTROLLER FOR A FULL-MOBILIZATION EXOSKELETON

(71) Applicant: ECOLE POLYTECHNIQUE FEDERALE DE LAUSANNE (EPFL), Lausanne (CH)

(72) Inventors: Tristan Vouga, Lausanne (CH); Romain Baud, Ecublens (CH); Jemina Fasola, Lausanne (CH); Mohamed Bouri, Chavannes-Renens (CH)

(73) Assignee: ECOLE POLY TECHNIQUE FEDERALE DE LAUSANNE (EPFL), Lausanne (CH)

( * ) Notice: Subject to any disclaimer, the term of this patent is extended or adjusted under 35 U.S.C. 154(b) by 1537 days.

(21) Appl. No.: 16/930,756

(22) Filed: Jul. 16, 2020

(65) Prior Publication Data

US 2021/0015694 A1 Jan. 21, 2021

Related U.S. Application Data

(60) Provisional application No. 62/874,787, filed on Jul. 16, 2019.

(51) Int. Cl.
*A61H 3/00* (2006.01)

(52) U.S. Cl.
CPC ......... *A61H 3/00* (2013.01); *A61H 2003/007* (2013.01); *A61H 2201/1642* (2013.01);
(Continued)

(58) Field of Classification Search
CPC ................ A61H 3/00; A61H 2201/165; A61H 2201/5084; A61H 2230/625;
(Continued)

(56) References Cited

U.S. PATENT DOCUMENTS 5,312,669 A 5/1994 Bedard
5,432,703 A 7/1995 Clynch et al.
(Continued)

FOREIGN PATENT DOCUMENTS

CA 1276455 C * 11/1990 ........... A43B 13/145
CN 103735386 11/2015
(Continued)

OTHER PUBLICATIONS

Wang et al. Design and control of the Mindwalker exoskeleton. IEEE transactions on neural systems and rehabilitation engineering, 23(2), 277-286. (Year: 2014).*
(Continued)

*Primary Examiner* — Joseph D. Boecker
*Assistant Examiner* — Brian T Khong
(74) *Attorney, Agent, or Firm* — Sheridan Ross P.C.

(57) ABSTRACT

The invention concerns a method of performing automatic standing balance of a user in a full mobilization exoskeleton with at least a foot and using at least two actuated degrees of freedom, wherein a controller uses information provided from sensors to produce corrective movements in the actuated degrees of freedom, wherein an estimation of the center of mass of the system comprising user and exoskeleton is made and the controller applies corrective measures on the actuated degrees of freedom to influence the position of the center of mass with respect to a center of pressure with the ground on which the exoskeleton is standing. The invention also concerns a device using the method according to the invention.

17 Claims, 13 Drawing Sheets
(12 of 13 Drawing Sheet(s) Filed in Color)

(52) U.S. Cl.
CPC .................. *A61H 2201/165* (2013.01); *A61H 2201/5084* (2013.01); *A61H 2203/0406* (2013.01); *A61H 2205/088* (2013.01); *A61H 2205/102* (2013.01); *A61H 2205/12* (2013.01); *A61H 2230/625* (2013.01)

(58) Field of Classification Search
CPC .... A61H 2201/5061; A61H 2203/0406; A61H 1/0262; A61H 2205/12; A61H 1/0237; A61H 2201/1642–1647; A61H 1/0266; A61H 1/0274; A61H 2001/0203; A61H 2001/0207; A61H 2003/007; A61H 2205/088; A61H 2205/102; A61H 2201/5058; A61H 2201/50; A61H 2205/10; A61H 2230/00; A61H 2230/605; B25J 9/0006; B25J 9/0016; A61F 5/01; A61F 5/0102; A61F 5/0127; A61B 5/112; A43B 13/141; A43B 13/186–189; A43B 13/145; A43B 13/181–189
See application file for complete search history.

(56) References Cited

U.S. PATENT DOCUMENTS

| | | | | |
|---|---|---|---|---|
| 6,141,889 | A | 11/2000 | Baum | |
| 9,101,451 | B2 | 8/2015 | Chugunov | |
| 9,687,409 | B2 * | 6/2017 | Teng | A61H 1/024 |
| 10,610,438 | B1 | 4/2020 | Dines et al. | |
| 2010/0204627 | A1 | 8/2010 | Kazerooni et al. | |
| 2010/0262054 | A1 | 10/2010 | Summit et al. | |
| 2011/0082578 | A1 | 4/2011 | Stanhope et al. | |
| 2014/0000129 | A1 * | 1/2014 | Mueller | A43B 13/18 36/103 |
| 2015/0025423 | A1 | 1/2015 | Caires et al. | |
| 2015/0035195 | A1 | 2/2015 | Cirera Santasusana et al. | |
| 2015/0158175 | A1 * | 6/2015 | Kim | B25J 9/0006 700/261 |
| 2015/0305911 | A1 | 10/2015 | Schroeder | |
| 2015/0328840 | A1 | 11/2015 | Zachariasen et al. | |
| 2015/0351995 | A1 | 12/2015 | Zoss et al. | |
| 2016/0015532 | A1 | 1/2016 | Lee et al. | |
| 2016/0128890 | A1 | 5/2016 | LaChappelle et al. | |
| 2016/0158593 | A1 | 6/2016 | Craig et al. | |
| 2017/0065441 | A1 | 3/2017 | Lee et al. | |
| 2017/0242477 | A1 | 8/2017 | Rubin et al. | |
| 2017/0340504 | A1 * | 11/2017 | Sanz Merodio | A61H 3/00 |
| 2018/0110669 | A1 | 4/2018 | Rodriguez et al. | |
| 2018/0255868 | A1 * | 9/2018 | Cole | A43B 13/42 |
| 2019/0192373 | A1 | 6/2019 | Vouga et al. | |

FOREIGN PATENT DOCUMENTS

| | | | | |
|---|---|---|---|---|
| CN | 105434145 | | 3/2016 | |
| CN | 106063760 | | 11/2016 | |
| CN | 106074094 | | 11/2016 | |
| CN | 106239484 | | 12/2016 | |
| DE | 202013002572 | | 10/2013 | |
| EP | 1980224 | | 10/2008 | |
| EP | 2995284 | | 3/2016 | |
| GB | 2508204 | | 5/2014 | |
| JP | H10-202561 | | 8/1998 | |
| JP | 2013-094322 | | 5/2013 | |
| WO | WO 95/01141 | | 1/1995 | |
| WO | WO 98/14143 | | 4/1998 | |
| WO | WO 98/30176 | | 7/1998 | |
| WO | WO 01/06579 | | 1/2001 | |
| WO | WO 2006/055620 | | 5/2006 | |
| WO | WO 2007/045000 | | 4/2007 | |
| WO | WO 2008/066856 | | 6/2008 | |
| WO | WO 2008/111800 | | 9/2008 | |
| WO | WO-2009143161 | A1 * | 11/2009 | A61H 3/00 |
| WO | WO 2010/027968 | | 3/2010 | |
| WO | WO-2010062407 | A1 * | 6/2010 | A61F 5/0111 |
| WO | WO 2013/190495 | | 12/2013 | |
| WO | WO 2014/138871 | | 9/2014 | |
| WO | WO-2014159577 | A1 * | 10/2014 | A61B 5/1124 |
| WO | WO 2015/080596 | | 6/2015 | |
| WO | WO-2015107577 | A1 * | 7/2015 | A61H 1/0244 |
| WO | WO 2015/153633 | | 10/2015 | |
| WO | WO 2016/128877 | | 8/2016 | |
| WO | WO 2016/146960 | | 9/2016 | |
| WO | WO 2017/044093 | | 3/2017 | |
| WO | WO 2017/069605 | | 4/2017 | |
| WO | WO-2018222997 | A1 * | 12/2018 | A61F 2/64 |
| WO | WO-2019060791 | A1 * | 3/2019 | A61H 1/02 |

OTHER PUBLICATIONS

Notice of Allowance for U.S. Appl. No. 16/331,473, dated Nov. 15, 2021 7 pages.

Lenzi et al. "NEUROExos: a variable impedance powered elbow exoskeleton," IEEE, 2011 IEEE International Conference on Robotics and Automation, May 9-13, 2011, Shanghai, China, pp. 1419-1426.

Official Action for European Patent Application No. 17781182.5, dated Jan. 22, 2024, 10 pages.

Assisted Patent Search No. 17-30131, dated Jul. 4, 2017, 19 pages.

Vouga et al. "TWIICE—A Lightweight Lower-limb Exoskeleton for Complete Paraplegics," IEEE, 2017 International Conference on Rehabilitation Robotics (ICORR), Jul. 17-20, 2017, UII Centre, London, UK, pp. 1639-1645.

International Search Report prepared by the European Patent Office on Dec. 6, 2017, for International Application No. PCT/IB2017/055463.

Written Opinion prepared by the European Patent Office on Dec. 6, 2017, for International Application No. PCT/IB2017/055463.

"Rex Bionics—Reimagining Rehabilitation," Rex Bionics Ltd., 2019, 4 pages.

Adamczyk et al. "The advantages of a rolling foot in human walking," The Journal of Experimental Biology, Oct. 2006, vol. 209, No. 20, pp. 3953-3963.

Baud et al. "Bio-inspired standing balance controller for a full-mobilization exoskeleton," IEEE, 2019 IEEE 16th International Conference on Rehabilitation Robotics (ICORR), Jun. 24-28, 2019, Toronto, Canada, pp. 849-854.

Clauser et al. "Weight, Volume, and Center of Mass of Segments of the Human Body," Defense Technical Information Center, Aug. 1969, Fort Belvoir, VA, Tech. Rep., 112 pages.

Donati et al. Long-Term Training with a Brain-Machine Interface-Based Gait Protocol Induces Partial Neurological Recovery in Paraplegic Patients, Aug. 2016, Scientific Reports, vol. 6, No. 1, Article 30383, 16 pages.

Emmens et al. "Effects of a powered ankle-foot orthosis on perturbed standing balance," Journal of NeuroEngineering and Rehabilitation, 2018, vol. 15, Article 50, 13 pages.

Emmens et al. "Improving the Standing Balance of Paraplegics through the use of a Wearable Exoskeleton," IEEE, 2018 7th IEEE International Conference on Biomedical Robotics and Biomechatronics (Biorob), Aug. 26-29, 2018, Enschede, The Netherlands, pp. 707-712.

Fang et al. "Anthropometric and Biomechanical Characteristics of Body Segments in Persons with Spinal Cord Injury," Journal of Biomechanics, Apr. 2017, vol. 55, pp. 11-17.

Farkhatdinov et al. "Assisting Human Balance in Standing With a Robotic Exoskeleton," IEEE Robotics and Automation Letters, 2019, vol. 4, No. 2, pp. 414-421.

Fasola et al. "Balance Control Strategies during Standing in a Locked-Ankle Passive Exoskeleton," IEEE, 2019 IEEE 16th International Conference on Rehabilitation Robotics (ICORR), Jun. 24-28, 2019, Toronto, CA, 6 pages.

Griffin et al. "Stepping Forward with Exoskeletons: Team IHMC's Design and Approach in the 2016 Cybathlon," IEEE Robotics & Automation Magazine, Dec. 2017, vol. 24, No. 4, pp. 66-74.

Harib et al. "Feedback Control of an Exoskeleton for Paraplegics: Toward Robustly Stable, Hands-Free Dynamic Walking," IEEE Control Systems Magazine, Dec. 2018, vol. 33, No. 6, pp. 61-87.

(56) References Cited

OTHER PUBLICATIONS

Patla et al. "Anticipatory control of center of mass and joint stability during voluntary arm movement from a standing posture: interplay between active and passive control," Experimental Brain Research, Feb. 2002, vol. 143, No. 3, pp. 318-327.
Rajasekaran et al. "An adaptive control strategy for postural stability using a wearable robot," Robotics and Autonomous Systems, Nov. 2014, vol. 73, pp. 16-23.
Schrade et al. "Development of VariLeg, an exoskeleton with variable stiffness actuation: first results and user evaluation from the CYBATHLON 2016," Journal of NeuroEngineering and Rehabilitation, Dec. 2018, vol. 15, No. 1, 18 pages.
Schütz "Robotic exoskeleton: For a better quality of life," Maxon, Jan. 31, 2012, 4 pages.
Winter "Human balance and posture control during standing and walking," Gait & Posture, Dec. 1995, vol. 3, No. 4, pp. 193-214.
Official Action for U.S. Appl. No. 16/331,473, dated Jan. 8, 2021 9 pages Restriction Requirement.
Official Action for U.S. Appl. No. 16/331,473, dated Apr. 13, 2021 13 pages.

* cited by examiner

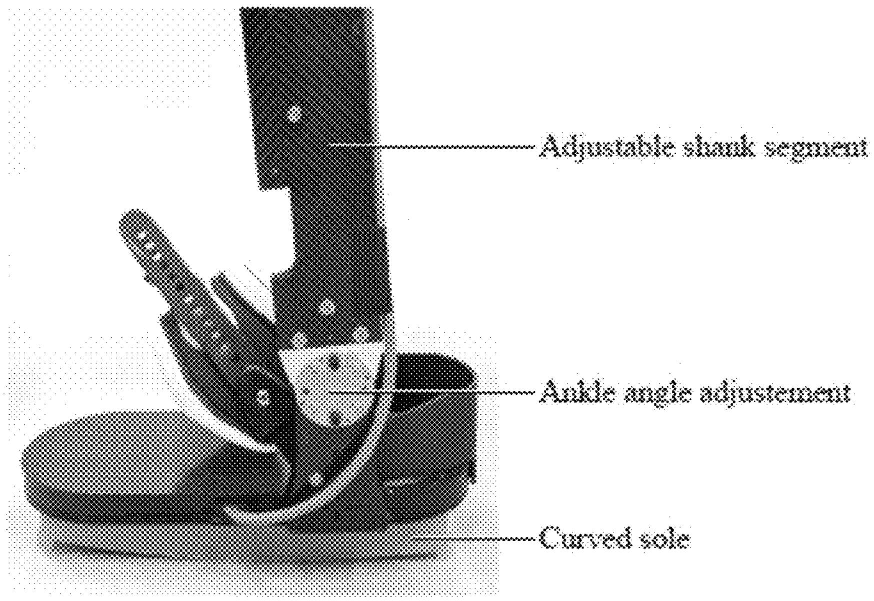
Fig. 1: CAPTUR foot design

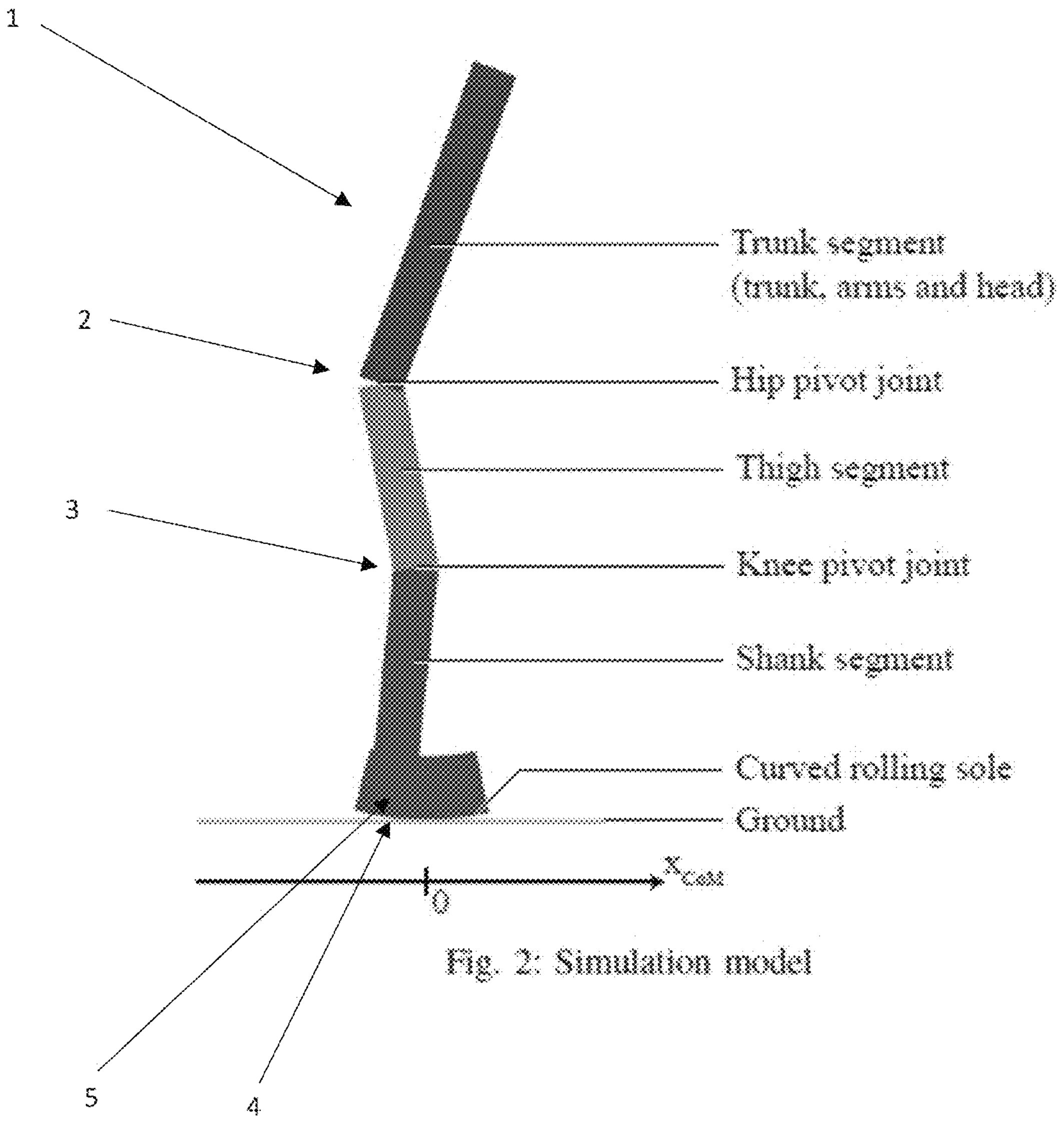
Fig. 2: Simulation model

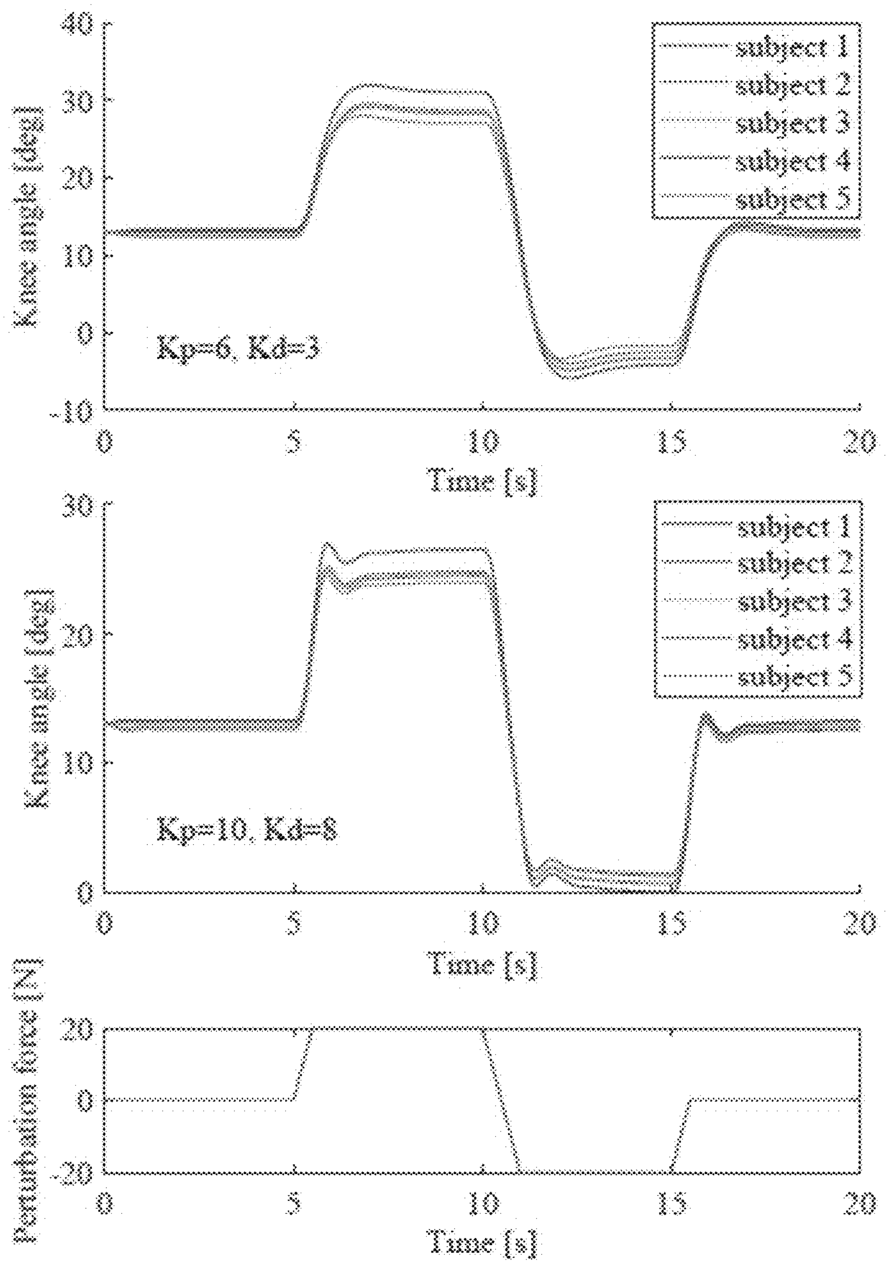
Fig. 3: Response of the simulated system subject to a horizontal perturbation force

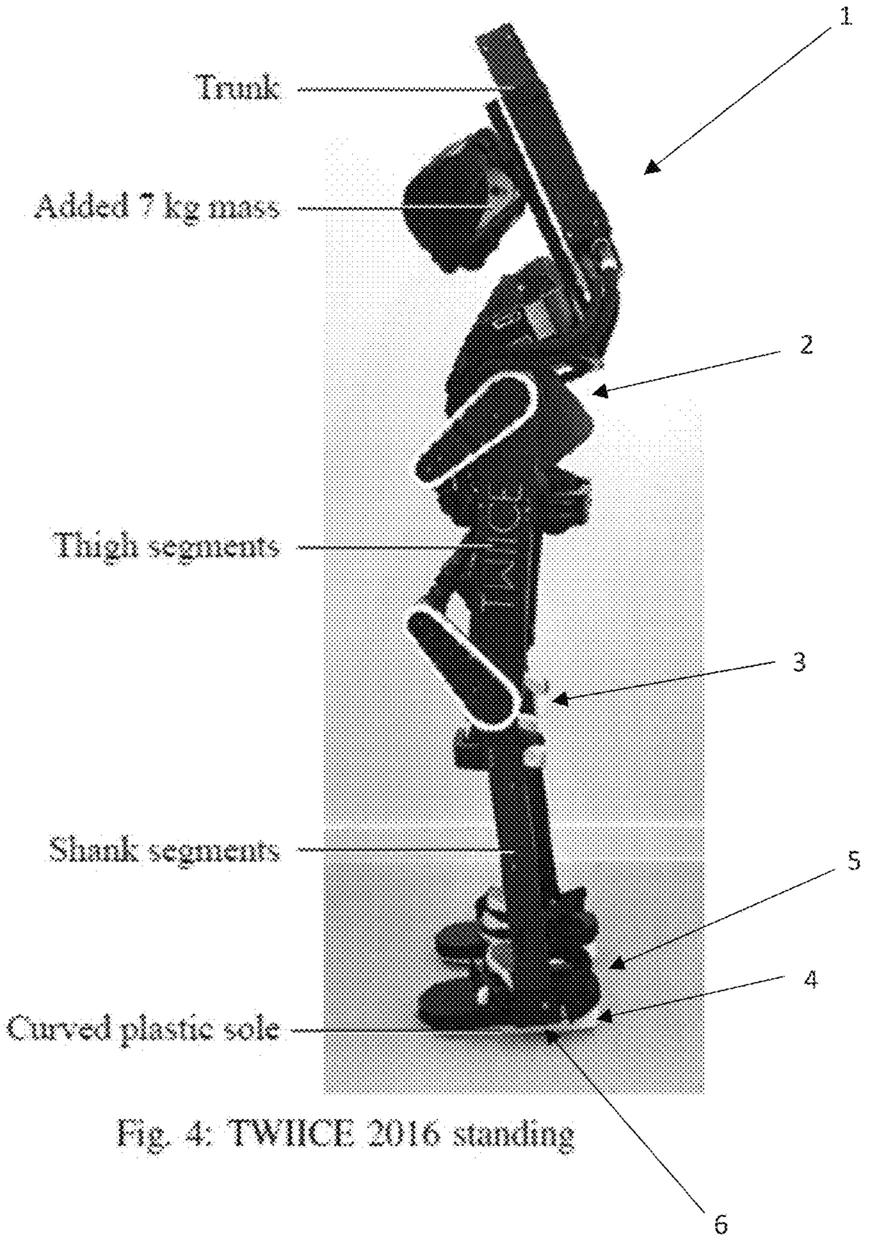
Fig. 4: TWIICE 2016 standing

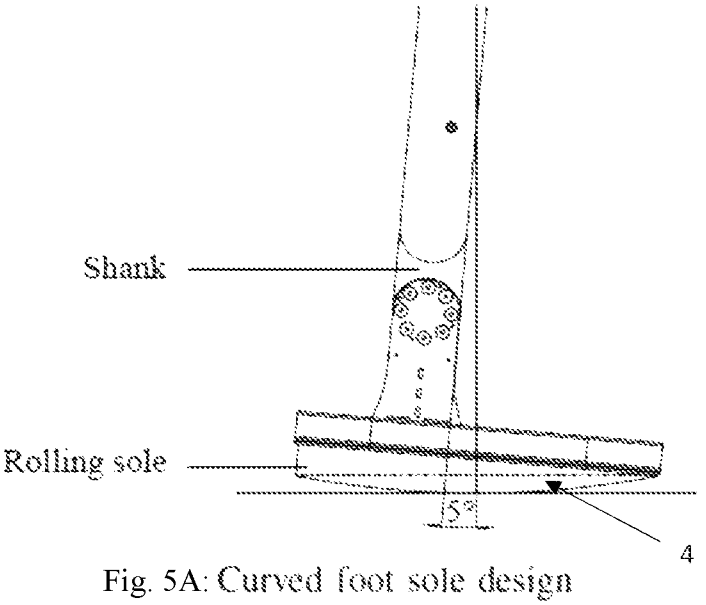
Fig. 5A: Curved foot sole design
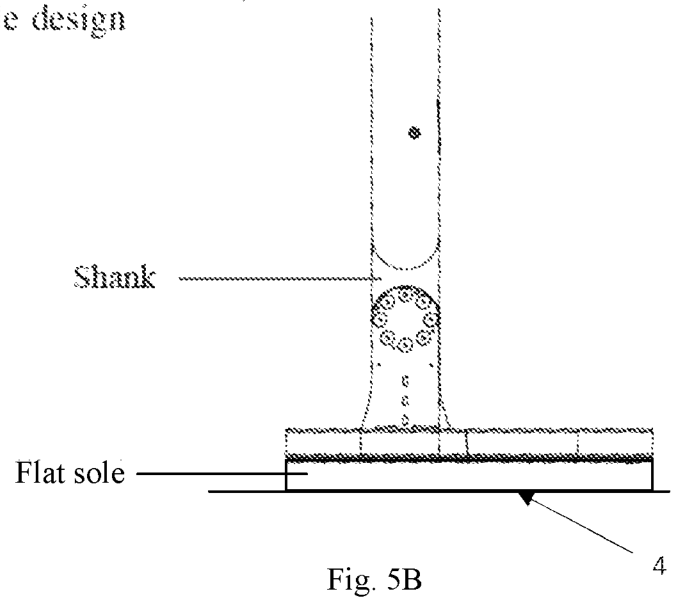
Fig. 5B
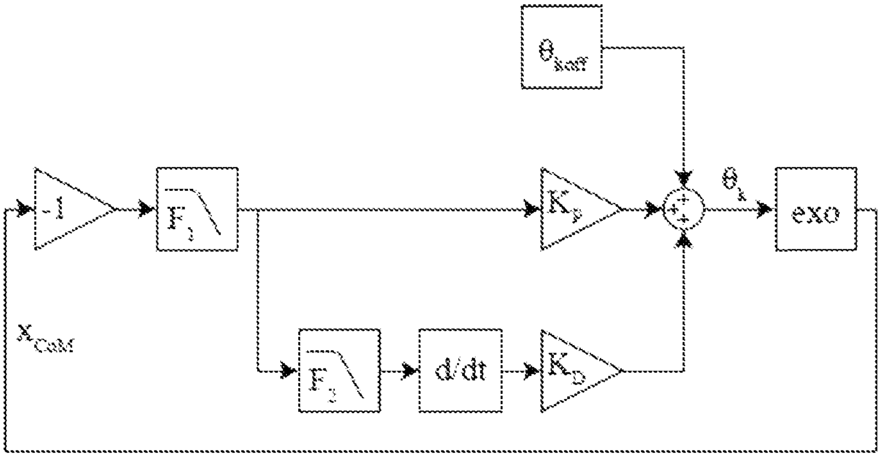
Fig. 6: Controller block diagram

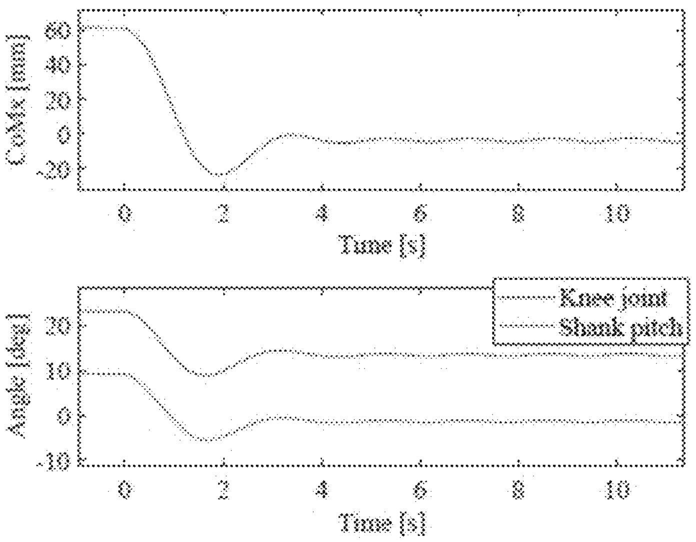
Fig. 7: Typical system response when released far from the equilibrium point. The exoskeleton was released at t=0 s.
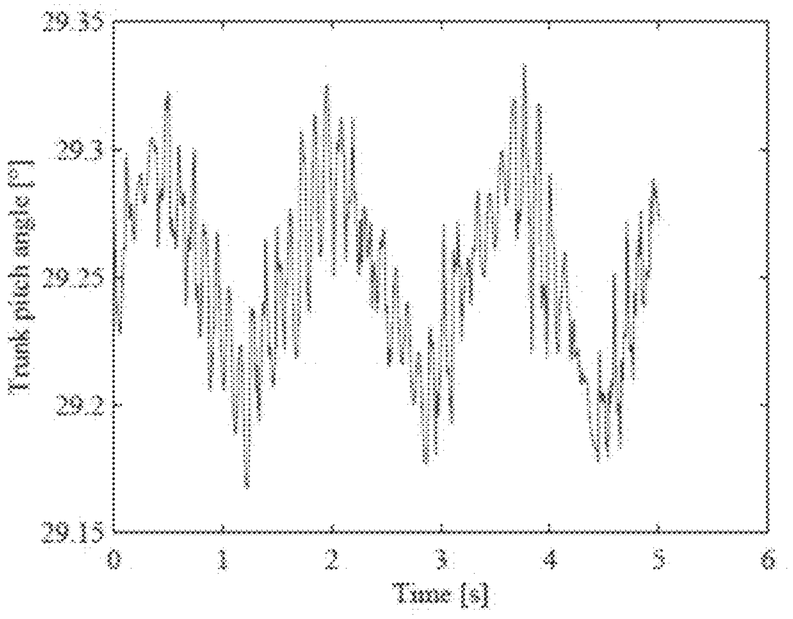
Fig. 8: Actual device steady-state limit cycle

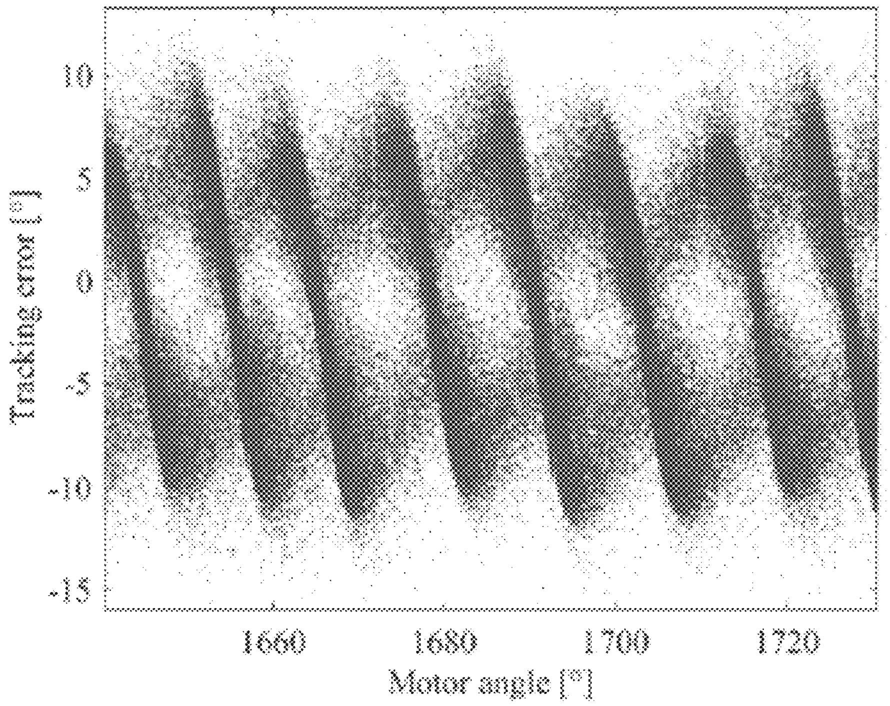
Fig. 9: Motor position tracking error

BIO-INSPIRED STANDING BALANCE CONTROLLER FOR A FULL-MOBILIZATION EXOSKELETON

CORRESPONDING APPLICATION

The present application claims priority to earlier U.S. Provisional Application Ser. No. 62/874,787 filed on Jul. 16, 2019, the content of this earlier application being incorporated by reference in its entirety in the present application.

TECHNICAL FIELD

The present invention concerns a method to perform automatic standing balance in a full mobilization exoskeleton. It exploits the locked ankle and the curved foot sole of the exoskeleton TWIICE as disclosed in reference [4] and in publication WO 2018/047129 (corresponding to US 2019/0192373), all incorporated by reference in the present application.

According to the present invention, an aspect is to use the knees 3 of the user to roll the sole of the exoskeleton 1 and change the position of the contact point with the floor, which allows to stabilize the exoskeleton 1 without an actuated ankle.

BACKGROUND

State of the art technology can be separated in two categories: devices that do not provide balance, and devices that do provide balance. Among those which do not provide balance, getting rid of the crutches, even momentarily, is extremely challenging and not indicated by instructions of use. Devices that provide balance are all extremely bulky, because they require the use of many actuated degrees of freedom. Their weight is at least 35 kg, up to 45 kg, which makes them impossible to use in daily living activities. In addition, they are limited to very flat and smooth terrain.

Full-mobilization exoskeletons for spinal cord injury (SCI) patients are not widespread. The two main reasons are the important cost of the device, and the controversial benefit for the activities of daily living (ADLs). These devices can be separated in two categories, depending on the requirement of using crutches for balance. Very few exoskeletons are able to assist walking without the need of crutches: the most well known are the Rex (Rex Bionics, New Zealand), the Atalante (Wandercraft, France) and the Santos-Dumont see reference [1]. However, they need 10 to 12 actuated degrees of freedom (DoFs), so are heavier (38 kg for the Rex see reference [2], 60 kg for the Atalante), slower (around 0.36 km/h), more expensive and cannot climb stairs. Apart from clinical benefits due to the standing posture, they do not bring any advantage for mobility compared to the wheelchair. The others, such as ReWalk (ReWalk Robotics, Israel), Ekso (Ekso bionics, USA), Indego (Parker Hannifin, USA), Mina v2 see reference [3], TWIICE see reference [4] and VariLeg see reference [5] can typically reach a speed close to 1 km/h, but since both arms hold the crutches, the interaction with the environment is limited.

Crutches-free gait is not achievable by a typical 4-DoFs exoskeleton (hip and knee flexion-extension). Standing should be possible because the lateral stability is kept passively thanks to the spacing between the feet. Since most of the interaction through the arms occurs when sitting or standing still, a useful trade-off would be to use balance control only when standing and use the crutches while walking.

Original design aspects of TWIICE 1 are its curved sole and locked ankle, which makes the design and manufacturing simpler. Another advantage of the current design is that the shoes are not part of the device and can be chosen by the user freely (depending on the weather conditions, medical reasons, dressing style, etc.). Also, the user does not have to remove his shoes when transferring into the exoskeleton 1.

The current sole is curved with a flat area. This flat area is actually not very useful, because it does not provide enough stability to stand without the help of the crutches. It does not help the stability when walking either, so the static balance is achieved solely with the quadrupedal gait, thanks to the crutches. A fully curved sole would allow a smoother rolling of the foot on the floor.

An objective of the present invention is to provide and enable a standing posture without crutches to guarantee the balance of an exoskeleton such as TWIICE. This would free the user's hands to interact with the environment. The proposed approach consists in particular (but not exclusively) in learning from the balance strategies employed by healthy people when they are constrained in a passive exoskeleton called CAPTUR see reference [6], and then implement the bio-inspired balance controller on an actuated exoskeleton such as TWIICE.

The application is structured to reflect the following methodology. First, the previous experiment with the CAPTUR will be described shortly, and the results suggesting balance strategies will be highlighted. Then, a controller will be proposed, and implemented in simulation to check its behavior. Finally, this controller is implemented in TWIICE, to experimentally evaluate the stability.

SUMMARY

When using lower-limb exoskeletons, patients currently have to use forearm crutches in order to stay upright. The present invention, devices and methods enable the user to get rid of the crutches by giving away the responsibility of balancing to the exoskeleton itself. This has huge implications for the usability of the device, as it enables the patient to perform many more activities while wearing the device. The controller's stability is such that the user can interact freely with the environment, as in lifting objects up to 3 kg, shaking hands, pressing buttons, operating appliances, receiving and tossing a ball etc. This is a major competitive advantage with respect to all existing competing technologies.

The present invention concerns methods and means to provide balance control of an exoskeleton device while standing. The proposed controller is unique in that it enables balance control using as few as two actuated degrees of freedom per leg, i.e. the knee 3 and hip 2 flexion/extension. This is remarkable as it allows for a lighter and simpler device.

The balance controller uses information from sensors embedded in the device to produce corrective movement at the hips 2 and knees 3 in order to stabilize the user, even in the case of a completely paralyzed user. When the controller is active, the user does not need any external help or device such as forearm crutches to stand still.

The proposed approach combines the benefits of both categories: free hands while standing, and agility and speed in rough terrain while walking. This is a very interesting tradeoff, as validated by most end-users interviewed about this possibility. Also, it has the advantage of enable position control of the joints, which is much simpler to implement than the most common torque control required by other approaches.

The controller is based on the estimation of the center of mass of the system comprising human and exoskeleton. The estimation is made using inertial measurement units or other orientation determining sensors. Using the knee 3 and hip 2 actuators, the controller applies corrective measures to influence the position of the center of mass with respect to the center of pressure with the ground. The corrective measures can be of three kinds: 1. meant to modify the position of the center of pressure; 2. meant to modify the conformation of the device in space in order to apply a static corrective torque with respect to the center of pressure by shifting the upper body weight forward or backward, 3. meant to apply a corrective torque by accelerating the torso in one or the other direction.

This invention sets itself apart from previously described work by the reduced number of necessary actuators. Previous work used actuators at the ankle and means of measuring ground reaction moment caused by ankle plantar/dorsiflexion. While this can be efficient, it imposes additional weight at the ankle, reducing the dynamic capabilities of the device in general. With the proposed approach, a completely passive ankle can be used. The moment created by the ground reaction force is only given by the position of the center of pressure along the foot and not regulated by a dedicated actuator.

In embodiments, the present invention concerns methods of performing automatic standing balance of a user in an exoskeleton 1 with at least a foot 5 and using at least two actuated degrees of freedom, wherein a controller uses information provided from sensors to produce corrective movements in the actuated degrees of freedom, wherein an estimation of the center of mass (CoM) of the system comprising user and exoskeleton is made and the controller applies corrective measures on the actuated degrees of freedom to influence the position of the center of mass with respect to a center of pressure with the ground. In embodiments, the exoskeleton may be a full mobilization exoskeleton. In such case the balancing task is carried out without the collaboration of the user/wearer.

In embodiments of the invention the two actuated degrees of freedom are preferably the knee 3 and hip 4 flexion/extension.

In embodiments of the invention the corrective measures are meant to modify the position of the center of pressure (CoP), or to modify the conformation of the device in space, or to apply a corrective torque by accelerating the torso of the user in one or another direction.

In embodiments of the invention the method uses position-controlled joints 3, 4 so there is no need for torque-controlled joints.

In embodiments of the invention the foot sole is curved with a curvature and the method exploits the curvature of the foot sole 4, rolling to change the position of its point of contact with the floor.

In embodiments of the invention the method uses the knee flexion to influence the position of the CoP, through the orientation of the foot. Motorized hip joints are not necessary, so the method according to the invention could also be applied to a knee-only exoskeleton.

In embodiments of the invention an inertial measurement unit (IMU) is located in the foot, which removes virtually all the linear acceleration, so the orientation estimation can be performed by relying solely on the accelerometer. This avoids the usage of the gyrometer, which could have integration drift if it is not properly calibrated.

In embodiments of the invention the IMU may also be located in other locations on the body using orientation estimation and proprioception of the robot to estimate position of center of pressure with the ground or angle of orientation of the foot with respect to the ground.

In embodiments of the invention the position of the center of pressure (CoP) may also be estimated using pressure or force sensors in the feet for example, In embodiments of the invention the center of mass (CoM) estimator is based on an approximate three weighted segments model, and an online compensation (currently based on the average orientation of the foot, but a full Kalman filter could probably be more performant).

In embodiments of the invention since the system is position-controlled and the ground contact point is known, the "margin of stability" may be estimated. If it becomes too low, a vibratory or acoustic feedback may warn the user to revert or slow-down his movement (e.g. releasing or lowering the lifted object) and thus avoid a fall.

In embodiments the invention concerns a device using the method as defined herein to perform automatic standing balance of a user.

In embodiments of the invention the device is preferably an exoskeleton 1.

In embodiments of the invention the device such as an exoskeleton 1 comprises at least two actuated degrees of freedom formed by joints 2, 3.

In embodiments of the invention the joints 2, 3 are preferably position controlled joints.

In embodiments of the invention the device comprises at least an inertial measurement unit 6 (IMU).

In embodiments of the invention the inertial measurement unit 6 is located in a foot 5 of the exoskeleton 1.

In embodiments the ankle joint may have an actuator. The actuator may be fixed or movable. Preferably, the ankle joint actuator is not used when carrying out the method of the invention.

In embodiments the sole of the foot is curved. In other embodiments, such as illustrated in FIG. 5B, the exoskeleton may use a flat foot sole with a variable sole stiffness profile such that changing the foot angle with respect to the ground moves the center of pressure fore-aft.

In embodiments, such as FIG. 5B, the exoskeleton may use a soft flat foot sole such that changes the foot angle with respect to the ground also moves the center of pressure fore-aft.

Further disclosure of embodiments of the method and of exoskeletons according to the present invention are contained here below in the detailed description of embodiments of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 1 illustrates a CAPTUR foot design.

FIG. 2 illustrates a simulation model.

FIG. 3 illustrates the response of a simulated system subjected to a horizontal perturbation force.

FIG. 4 illustrates the TWIICE exoskeleton.

FIG. 5A illustrates a curved foot sole design.

FIG. 5B illustrates a flat foot sole design.

FIG. 6 illustrates a controller block diagram.

FIG. 7 illustrates a typical system response when released far from the equilibrium point.

FIG. 8 illustrates a steady-state limit cycle according to the present invention.

FIG. 9 illustrates a motor position tracking error.

Figure 10:
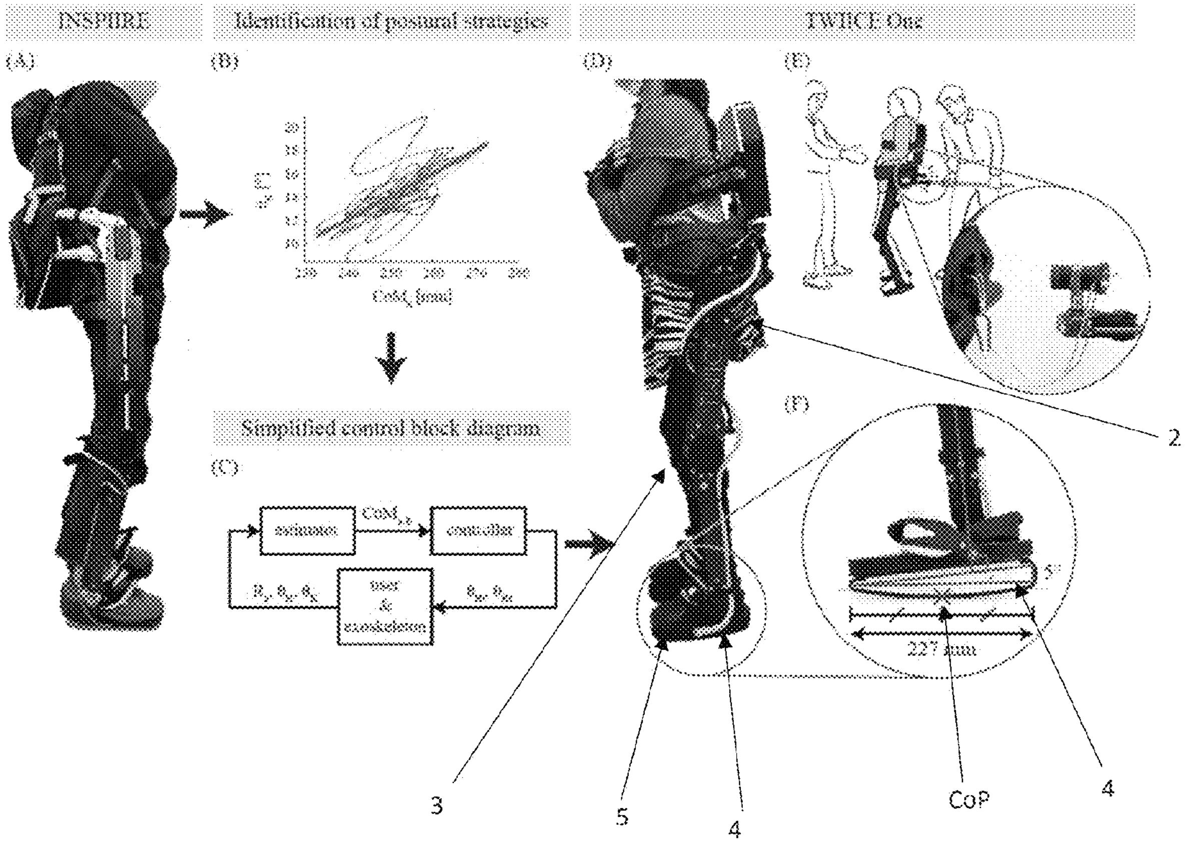
FIG. 10 illustrates.

(A) A healthy participant standing while being constrained by INSPIIRE, a passive exoskeleton.

(B) Identified relation between the knee 3 angle and the $CoM_x$ for a typical young healthy participant in the eyes closed condition from [18].

(C) Overview of the controller block diagram. $CoM_x$-E is the estimated projection of the center of mass, Rx represents the foot pitch angle, while θH and θK are the hip 2 and knee 3 angles, respectively.

(D) TWIICE 1 running with the knee controller (BKC) and a complete SCI user.

(E) Overview of the experimental setup, with the experimenter in the back, and the spotter in front. The experimenter interacts with the exoskeleton 1 through the instrumented stick.

(F) Close-up view on the TWIICE foot, with the rounded sole 4 and the 5° wedge. The red cross is the position of the CoP, at the middle of the foot 5 in this case. This is considered as the "horizontal" position of the foot 5.

Figure 11:
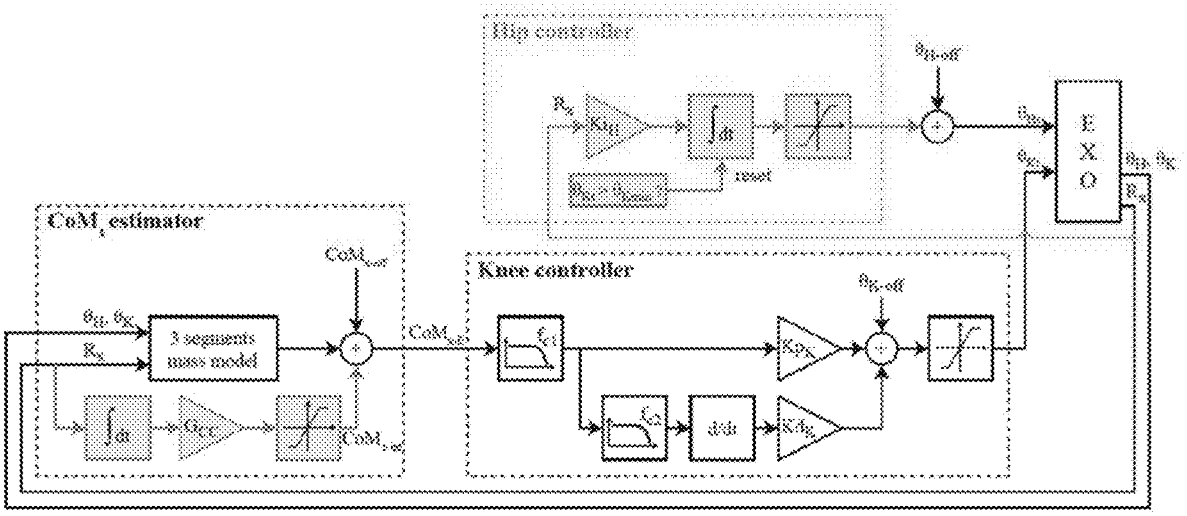

FIG. 11 illustrates a block diagram of the two controllers.

Figure 12:
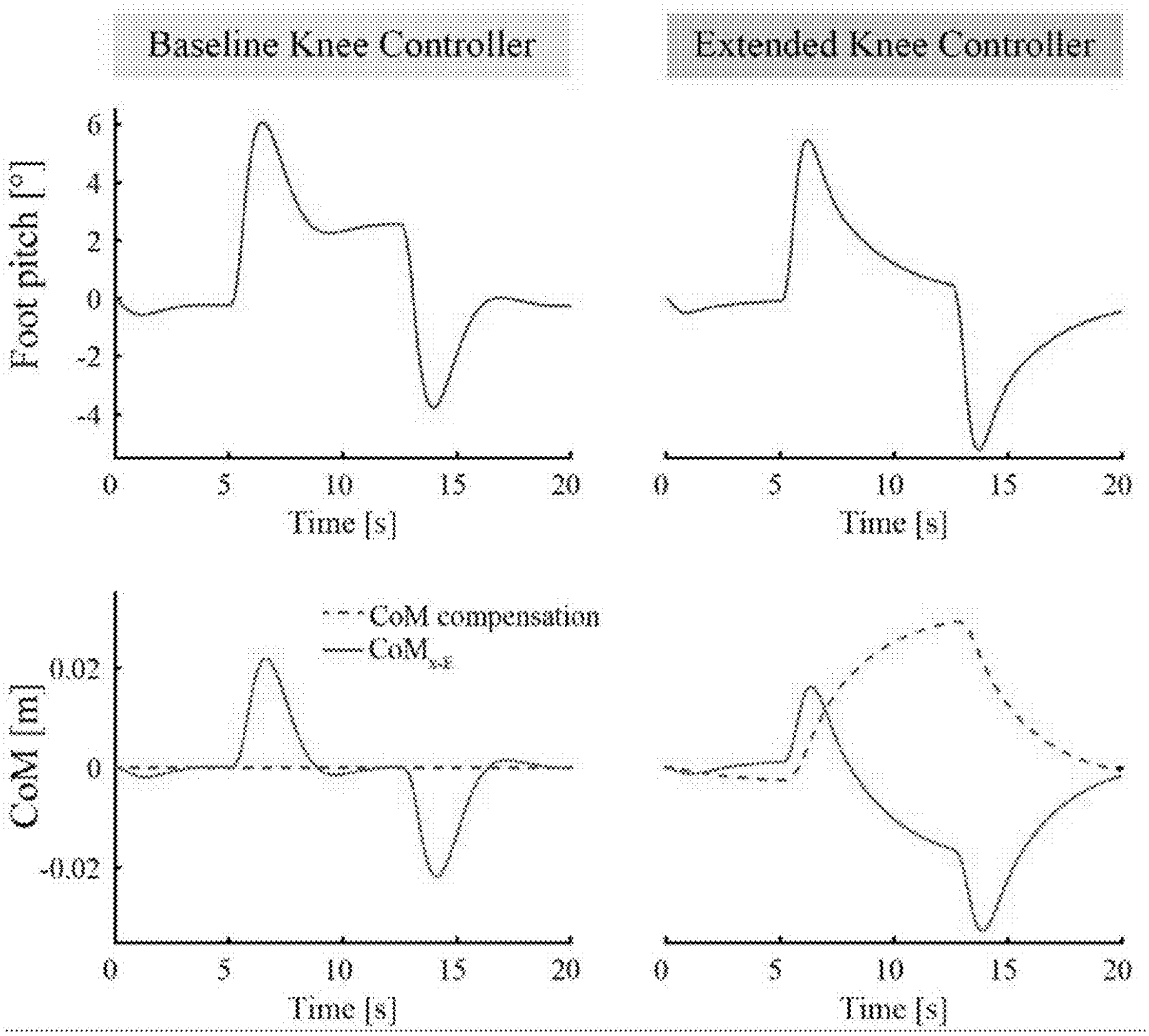

FIG. 12 illustrates Simulation results comparing BKC (baseline knee controller) (with PID) and EKC (extended knee controller) when subject to a constant horizontal perturbation force.

Figure 13:
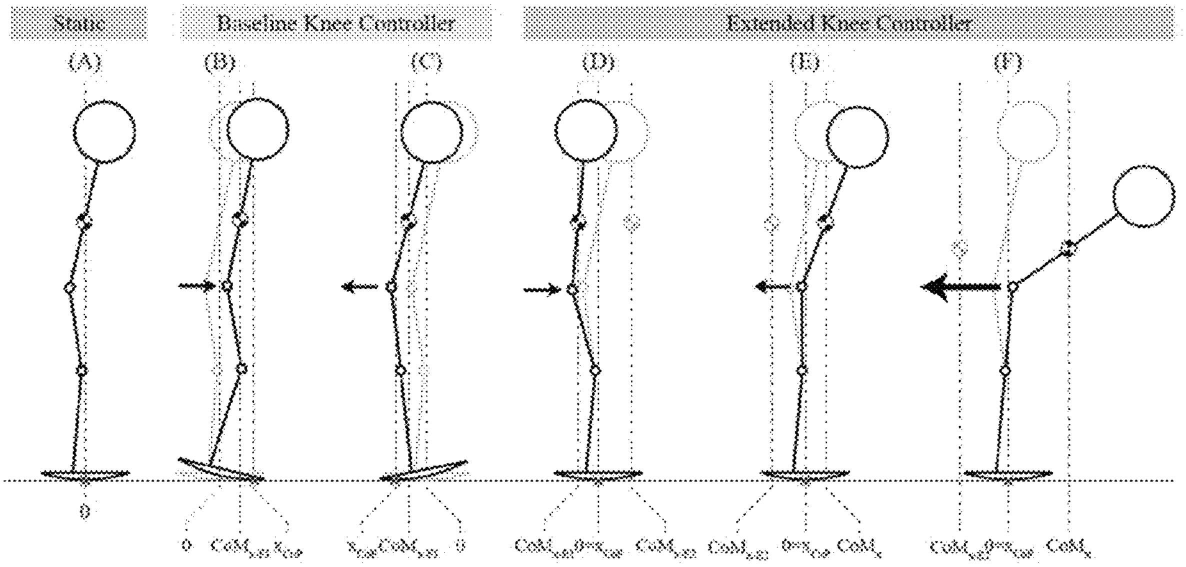

FIG. 13 illustrates Stick-figures showing the behavior of both controllers, at steady-state. The gray stick-figure is the initial rest position. The arrows indicate the direction of the perturbation while their size is proportional to the perturbation amplitude. The red crosses on the ground represent the position of the point of contact with the ground, which is equivalent to the CoP in the sagittal axis (xCoP). The gray stick figures in background are the initial equilibrium position, same as the A.

Figure 14:
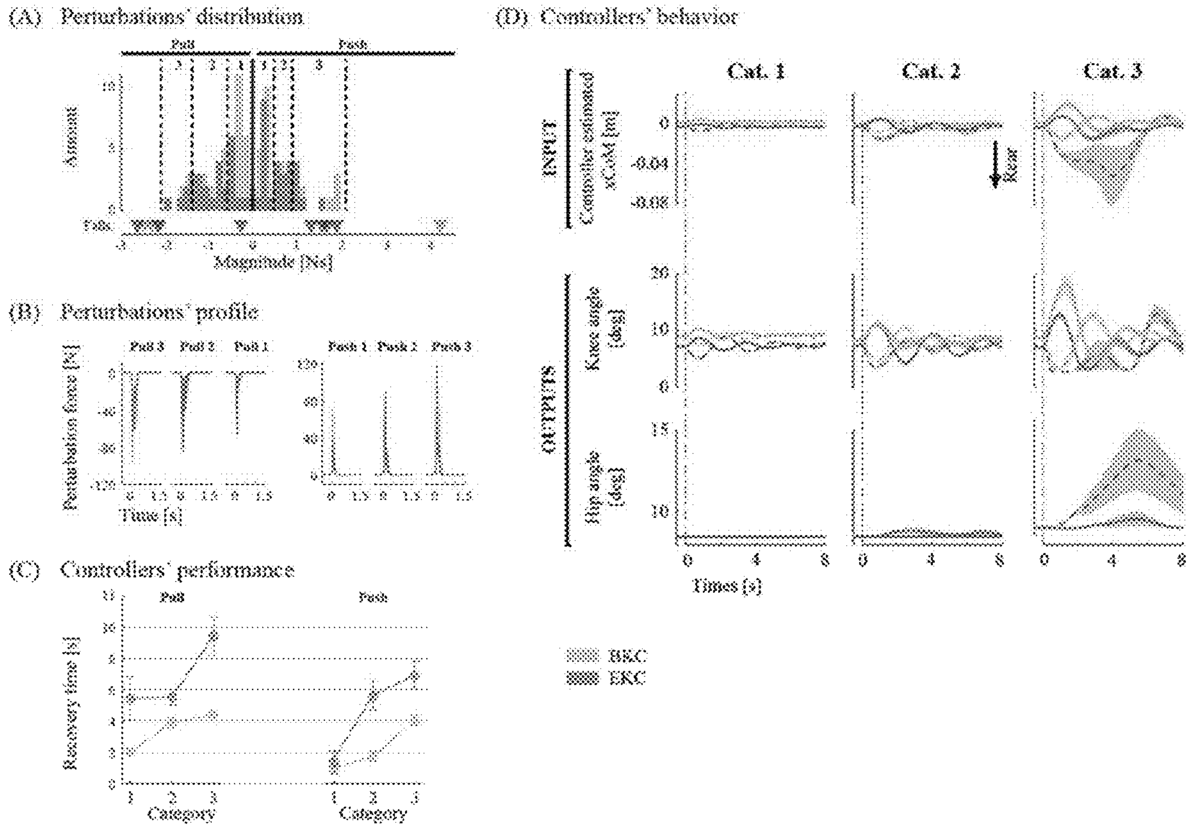

FIG. 14 illustrates (A) The perturbations of similar magnitude are grouped in 3 categories for each direction. The thresholds of each category are represented by the vertical dotted lines. Underneath the histograms, perturbations that led to a fall are presented by a triangle.

(B) Individual perturbation force profiles are shown by category.

(C) Controllers' performance is evaluated with the recovery time.

(D) average system response of the two controllers subject to the 3 categories of perturbation Magnitudes. Solid lines represent posterior perturbations, while dotted lines denote anterior ones. Overall, the colors correspond to the controllers (orange for BKC and blue for EKC).

Figure 15:
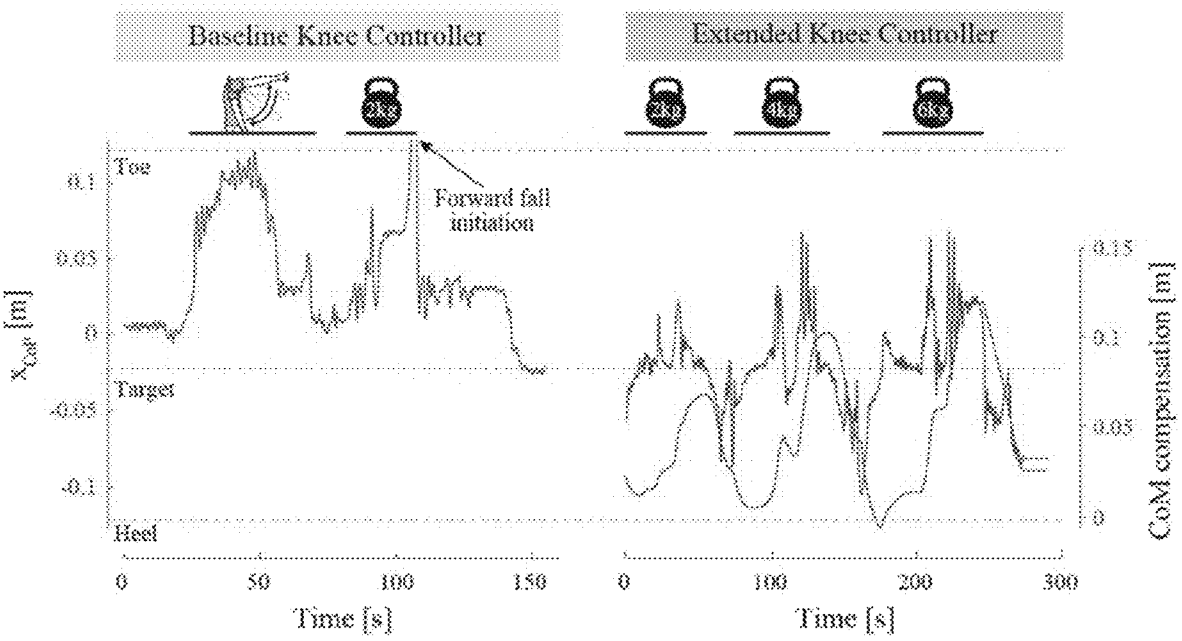

FIG. 15 illustrates a foot contact point position (xCoP) along the curved soles 4 during object lifting perturbations.

DETAILED DESCRIPTION

Description of CAPTUR, Non-Powered Exoskeleton

CAPTUR, a non-actuated lightweight lower limb exoskeleton, has been developed at EPFL by the Robotic Systems Laboratory (LSRO) for the analysis of the gait and balance under kinematic constraints. Its limited mobility at the hip and ankle joints, reproduces the DoFs of the most common full mobilization exoskeletons for paraplegic patients. The hip and the knee joints are limited to flexion and extension by revolute joints. All the other DoFs of the legs are rigidly locked, which forces healthy subjects to use unusual strategies and compensatory movements.

In addition, CAPTUR is built with similar body attachment interfaces, structural weight, and the same instrumentation as TWIICE (joint encoders, IMUs, feet load cells with the same layout). Its structure is made of stiff composite materials and aluminum, to prevent the wearer movements in the frontal plane. The ankle dorsiflexion angle is adjustable.

The foot design is similar to the one of the TWIICE exoskeleton see reference [4] with a sole that can be changed easily.

Experimental Protocol

The experiment on standing balance in CAPTUR (see FIG. 1) was described in reference [6]. The sole installed is slightly different from the one used in TWIICE since it is quasi-circular with a radius of 0.65 m. The flat part was intentionally removed to prevent passive standing stability and to avoid any discontinuities when rolling on the floor. This sole is made of medium-density fiberboard (MDF) and was not covered by a rubber layer. In addition, the CAPTUR ankle angle was set to 5° (FIG. 1). The participants were asked to stand while wearing the CAPTUR. Five conditions were assessed during the same session. For each condition, the participants were instructed to keep their feet on the ground and their arms crossed against their upper body. The five conditions were: eyes opened (EO), eyes closed (EC), visual feedback (VF), cognitive load (CL), and random frontal perturbation (RP). In RP, the subjects were challenged by the experimenter which applied random fore-aft perturbations (smaller than 20 N) at the hip level.

Results of Interest

The analysis of the experimental data exhibited a correlation relevant for this study. For all the subjects, in the RP condition, there is a strong correlation (−0.88±0.02) between the knee joint angle and the position of the center of mass (CoM). The corresponding relation is $-0.34°\ mm^{-1}\pm 0.03$. The correlation between the knee joint angle and the CoM speed is dramatically lower (−0.05±0.03).

It is hypothesized here that this first correlation reveals a knee-based strategy for balance. A possible mechanism would be using the movement of the knees to roll the foot and change the position of the point of contact on the ground.

A hip strategy (such as the one described in reference [7]) has not been clearly detected by this previous study, so it will not be considered here.

TABLE I

CAPTUR segments settings and subjects characteristics

| # | Height [m] | Shank length [m] | Thigh length [m] | Mass [kg] |
|---|---|---|---|---|
| 1 | 1.84 | 0.615 | 0.450 | 72 |
| 2 | 1.80 | 0.615 | 0.450 | 73 |
| 3 | 1.79 | 0.615 | 0.450 | 72 |
| 4 | 1.81 | 0.615 | 0.450 | 64 |
| 5 | 1.71 | 0.580 | 0.415 | 70 |

Simulation

This knee strategy is first implemented and evaluated in a simplified simulation model.

a) Dynamic model: A two-dimensional simulation model was built using Simulink with Simscape Multibody (MathWorks, USA). We have only considered the movements of 3 segments (foot and shank, thigh, trunk with arms) in the sagittal plane which lump together the CAPTUR and the test subject. The 3 blocks have a brick shape with uniform density, and the feet are massless. The sole is modelled by an arc of radius of Rsole equal to the CAPTUR soles', rolling on the floor without slippage (FIG. 2). The hip 2 and knee 3 are modelled by position-controlled revolute joints. No noise was added to the sensory data. The simulation reproduces the RP condition, with a perturbation force profile shown on FIG. 3. For each test condition, the simulation is run once per subject, changing accordingly the height, thigh length, shank length and body mass parameters in the model to match the experiment. The CAPTUR segments settings and the subject's characteristics are listed in table I above. The mass of the segments of the subjects were estimated from reference [8].

b) proportional (P) control: The hip 2 joint angle is set such that the trunk pitch angle remains constant. This pitch angle could not be directly taken from the CAPTUR experiment data, because of the uncertainty on the mass distribution. Instead, the trunk pitch angle is selected automatically before the simulation to optimize the initial CoM location (the uncontrolled exoskeleton should fall as slowly as possible) by running repeatedly the simulation for 1 s.

Since there was a strong correlation of the knee angle with the center of pressure (CoP) position, but not the CoP speed, the controller initially tested was the P controller. The knee joint angle $\theta_k$ is then computed as proportional to the estimated position of the CoM projected on the floor ($x_{CoM}$). This commanded knee angle is then offset by a positive angle $\theta_{koff}$ to keep the knee flexed and avoid reaching the mechanical stop of the full extension. This angle was set to a value of 13°, observed in the previously described experiment: the average knee angle was 12.8±2.2° in EO, 13.1°±3.2° in RP. The expression of this controller is:

$$\theta k=\theta_{koff}+K_p x_{CoM}$$

Unfortunately, this controller was unstable, resulting in undamped oscillations with an increasing amplitude over time. Lowering the gain did not allow to reach stability.

c) proportional-derivative (PD) control: in order to compensate for the lack of damping of the system, the controller was improved by adding a derivative term to the regulator. The P controller is replaced by a parallel-form PD controller. The hip control remains the same. This gives:

$$\theta_k=\theta_{koff}+(K_p x_{CoM}+K_d \dot{X}_{CoM})$$

The results of the simulation are shown on FIG. 3. The system response does not change much because most of the subjects had a similar height and weight, except subject #4 which was less heavy.

With the identified proportional gain of 6 rad $m^{-1}$, very large knee movements can be observed, and the overall behavior is unrealistic because of the hyperextension of the knee. Higher gains (Kp=10 rad $m^{-1}$, Kd=8 rad/(m/s)) solved this issue.

With a simulated horizontal perturbation force of 20 N at the level of the hip axis, the simulation predicts a knee flexion/extension of 12.0°±0.7. This value is higher than the one observed in the CAPTUR experiment in the RP condition (7.6°±2.8).

The differences observed in the system response could be explained by the fact that the trunk strategy is absent from the model, so the knee contribution to the stabilization has to be stronger.

Implementation on TWIICE

In this section, the controller is implemented on a TWIICE exoskeleton and evaluated, to validate the feasibility before initiating tests with human subjects.

A. Hardware Setup

The identified knee-based controller has been implemented on TWIICE 2016 exoskeleton 1 (see FIG. 4), described in reference [4].

The soles 4 have been modified to be circular with the same radius as the CAPTUR soles, instead of having a flat in the middle. They were produced in PLA plastic by the fused deposition modeling (FDM) process. The arc length is 21.3°, which corresponds to a possible travel of the contact point of 242 mm. Its base is wedged such that when the middle of the arc is in contact with the floor, the foot (and hence the shank segment) is tilted by 5° toward the front, to emulate the dorsiflexion angle of the ankle of the CAPTUR (see FIG. 5A). We experimentally checked that no stable equilibrium point exists when the exoskeleton is not actuated, so passive balance is not possible.

Since the exoskeleton 1 will operate without a user, its CoM is shifted to the rear, because of the weight of the back structure and the battery. This issue was fixed by adding a 7 kg mass at the level of the thoracic belt, 31 cm over the hip joint 2 axis (see FIG. 4).

The inertial measurement unit (IMU) 6 is identical to the one used in CAPTUR (MPU-6050, InvenSense, USA). The feet load cells are not used in this controller.

B. Control

The controller implemented on TWIICE is the same as the one of the simulation, except that first-order low-pass filters have been added to lower the sensory noise (FIG. 6), and prevent high-frequency oscillations (cut-off frequency:

$$F_{1c}=6.7\text{ Hz},F_{2c}=5\text{ Hz}).$$

The first filter prevents the output to react to the relatively high frequency oscillation that shakes the IMU in case of non-smooth movements. The second filter further smooths the signal to allow a large Kd gain. However, because of the lag induced by the filters, the original regulator gains resulted in a strongly unstable system. The gains have been lowered and tuned by trial-and-error:

$$K_p=2.62\text{ radm}^{-1}\text{ and }Kd=0.87\text{ rad/(m/s)}.$$

The system is expected to be easier to control when the exoskeleton includes a subject, because of the increased damping.

The control loops are running at the usual cadence for TWIICE: balance control loop at 500 Hz, position control at 1000 Hz, and motor current control at 10 kHz.

The trunk pitch angle is set at the beginning of the experiment when the controller is disabled, such that the unstable equilibrium occurs when the middle of the sole is in contact with the ground. Since the masses distribution model is not perfectly accurate, an offset to the computed $x_{CoM}$ is added.

Baseline Knee Controller

A "Baseline Knee Controller" (BKC) regulates the balance with a proportional-derivative (PD) controller, setting the angle of the knee 3, and fed with the CoM position (see FIG. 11). This "Baseline Knee Controller" was described, simulated and experimentally tested see reference[17]. The knees 3 are flexed proportionally to the estimated position of the CoM. This makes the foot sole 4 rotate forward and backward, and move the point of contact with the floor. Since the sole 4 is only in contact with the ground at one point, this point corresponds also to the center of pressure, xCoP, on the anteroposterior axis. CoMx is the position of the projection on the ground of the CoM, on the anteroposterior axis. Its origin is defined at the middle of the foot when it is in contact with the ground. In this BKC controller, the CoMx estimation is computed using a simple 2D model consisting of 3 segments (foot to knee, knee 3 to hip 2, trunk including the head). The trunk length was measured on the user, while the shank and thigh lengths were obtained from the 3D model of the exoskeleton. The masses were obtained by summing the pilot's and exoskeleton's segments. The masses of the user segments were estimated from the full bodyweight using the mass repartition from reference [19], considering the data corresponding to "chronic SCI≥3 years" and "BMI<25". Finally, an offset, CoMx-off, is added to the estimation of CoMx to obtain CoMx-E, which is called CoMx-E1 in the BKC case. This offset is necessary because the model is not accurate.

CoMx-E is first filtered by a low-pass filter with a cut-off frequency fc1, then fed into a proportional-derivative controller (PD) with the parameters KpK (proportional part gain) and KdK (derivative part gain). Before differentiation, the signal is filtered by a stronger low-pass filter with a cut-off frequency fc2. This gives a knee flexion angle, which is offset by θK-off to increase the flexion, and thus avoids hyperextension of the knee 3 when the output of the BKC controller is negative. For safety, the value is finally clamped to the range [2° to 40° ]. The hip joint is fixed at the angle θH-off.

A pilot study with the BKC controller has demonstrated its ability to make a complete SCI user stand dynamically with TWIICE. However, it was performing poorly for the task of grabbing heavy objects (several kilograms), unless they were close to the body. The first reason is that the CoMx-E1 computation is not accurate since it does not consider the added mass. The other reason is that the controller is managing the balance by moving the position of the CoP along the foot length, but this does not work in the case the added weight shifts the CoM beyond the span of the feet.

Extended Knee Controller

An extended knee controller (EKC) is based on the BKC, but with two additions to overcome the two aforementioned issues (FIG. 11, blue boxes).

The first change is the extension of the CoMx estimator to adapt the model online when a constant perturbation (added mass or horizontal force) arises. This is done with a gain (GCC) and an integrator of the foot pitch angle (Rx), which is added as a variable offset to the CoMx-E calculation, which is called $CoM_x$-E2 for this controller (FIG. 11, $CoM_x$ estimator, blue boxes). The idea is that in case of a permanent perturbation, the CoP will move durably, closer to an end of the foot, which decreases the robustness against perturbations in this direction. Continuously increasing the $CoM_x$-E offset will increase the correction of the PD controller, until the sole starts to roll in the other direction. This means that if a steady-state exists, the center part of the foot 5 will be in contact with the floor.

Adding an integrator to the regulator to make a PID controller instead would not have the same results. This will not be proved analytically here, but intuitively, in case of constant perturbation with BKC and a PID, the steady-state will be reached when the $CoM_x$-E1 reaches zero, but the CoP will probably not be in the middle of the foot 5, so the robustness would be lower in one direction.

The second change is the addition of the hip 2 contribution when the knee 3 reached the full extension. In case the knee 3 reaches the full extension, an integrator with a gain KiH will gradually increase the hip flexion angle, to bring the trunk forward, and thus shift the CoM toward the front (FIG. 11, Hip controller, blue boxes). This flexion angle is limited to 60° for safety. If the knee angle is not saturating, the integrator value is reset to zero smoothly at a 2°/s rate. This conservative low value was selected to make sure it does not interfere the with the knee control and avoid oscillations.

Simulations have been performed with the same Simulink simulation environment described in reference [17]. The goal of this model is to check the proper operation of the controller, i.e. keeping the body standing without falling. The stability is assessed from the values of $CoM_x$-E and the foot pitch, which should remain close to zero. This model contains a three weighted segments model, lumping together the user body and the exoskeleton, the feet 5 rolling on the floor with no slippage. It is subject to a horizontal perturbation force, applied at the hip joint 2 axis, with a square profile: 0 N, then 20 N forward for 8 s, then 0 N again. The parameters have been set as follows: KpK=340°/m, KdK=170°/(m/s), no filtering. For BKC, KiK=340°/(m.$) and Gcc=0 m/(°.$). KiK is the integral coefficient if the knee PD controller is replaced by a PID. It is not required and will not be used on the actual device, but it allows a clearer comparison between the results obtained with BKC and EKC, thanks to the eventual cancellation of the $CoM_x$-E steady-state error (it will show that the effect of the integral component of EKC is not equivalent as using a PID with BKC). For EKC, KiK=0°/(m.$) and Gcc=0.000002 m/(°.$).

The results are exposed in FIG. 12. It can be noticed that both BKC and EKC both maintained the standing balance despite the perturbation. Both the foot pitch and $CoM_x$-E exhibit minimal oscillations. With BKC, the system is stable during the perturbation, but the foot is not horizontal at steady-state (2.6°), which leaves less control leeway for further pushes. In fact, the CoP reaches the end of the foot when |Rx|>10°. With EKC, the foot 5 also reaches approximately the 6° pitch angle when the perturbation is applied but then returns slowly to horizontal (CoP at the middle of the foot), which results in having the same room for maneuver in both directions again. While returning to the horizontal position, the foot pitch follows an exponential function with a time constant of 2.4 s (R2=0.997). This means that a stronger long-term perturbation should rise slowly, not quicker than a few seconds, otherwise the integral action of EKC will not compensate fast enough to avoid the fall.

The general behavior of the two controllers at steady-state can be seen in FIG. 13. In the BKC case, the system statically resists the perturbation by keeping the CoP more in the front (B) or in the rear of the foot (C). In the EKC case, the system resists statically by keeping the CoM toward the back (D) or toward the front (E), such that the CoP is at the middle of the foot. In the last case (F), the pulling force is stronger, and the knee reached the full extension and cannot extend more. The hip 2 then flexes to move the CoM even more in front.

C. Experiment

The test takes place over a hard linoleum floor, with negligible rolling resistance. TWIICE 1 is pulled away from the target equilibrium position by the experimenter, and released. This operation is repeated several times, increasing the distance at each trial, until the exoskeleton 1 is not able to recover. The tests are first performed by pulling the device towards the back, then towards the front.

D. Results

The controller was able to make TWIICE 1 keep standing autonomously and resist a CoM excursion of up to 50 mm to the back and 61 mm to the front. The typical response is shown on FIG. 7. The CoM returns to the initial position in one period, then keeps oscillating with an amplitude of 1 mm and a frequency of 0.6 Hz, even if not perturbated anymore.

The trunk also vibrates at a higher frequency (8.8 Hz). When tuning the regulator, the main limiting factor is the oscillation of the back part that arises quickly when increasing the gains, since it holds the IMU. This may be caused by the little amount of damping in the system, associated to a source of excitation that could be the motors torque ripple. In fact, they are iron-cored with strong magnets, so they exhibit an audible "cogging" effect when they are rotating at such low speed. This can be verified by inspecting the tracking error of the motor versus the motor position (see FIG. 9): the pattern repeats 30 times per rotor revolution, which matches the number of steps that can be counted by hand on an isolated motor.

1 Quiet Standing

The oscillation frequency is similar in both cases: 0.60 Hz for BKC and 0.63 Hz for EKC. It was computed by finding the frequency of the highest peak in the Fourier transform of the $CoM_x$-E1 signal. The RMS of the body sway was also similar (0.31 mm for BKC and 0.38 mm for EKC).

2 Pulse Perturbations

For BKC, 74 perturbations were applied, resulting in 4 fall initiations and 1 exclusion. For EKC, the test-pilot underwent 63 perturbations, including 7 fall initiations and 1 exclusion. The distribution of the perturbations magnitudes and perturbations forces by category are shown in FIGS. 14A and 14B. The average perturbation duration was 0.18±0.006 s and 0.19±0.006 s for BKC and EKC, respectively.

To characterize the robustness of the controllers, we determined the maximum anterior (pull) and posterior (push) perturbation amplitude the controllers can bear before a fall starts. For BKC, the maximal anterior perturbation magnitude that can be sustained is about 2 N.s. Beyond that threshold, 3 backward falls were recorded (see FIG. 14A, orange triangles). The threshold for posterior perturbations is between 2-4 N.s, as a push with a magnitude of 4 N.s triggered a frontal fall. For EKC, the maximal anterior perturbation magnitude is also around 2 N.s. Two perturbations above this threshold triggered a backward fall.

The maximal threshold for posterior perturbations is between 1.2-1.6 N.s. Indeed, 4 falls were observed when the perturbation magnitude was above this threshold (see FIG. 14A, blue triangles). It is important to note that the falls were in the backward direction although the perturbations were posterior (pushes). In summary, BKC was more robust than EKC for posterior perturbations, while they performed similarly for anterior perturbations.

To assess the performance of the controllers, the average duration of the measured recovery time has been extracted and plotted on FIG. 14C. The statistical analysis revealed a main effect of Controllers (F=29.9, p<0.001) and Category (F=14.31, p<0.01), but no interaction. Post-hoc analysis showed that BKC recovered significantly faster than EKC (p<0.001) and that recovery time significantly increased for each successive category (pcat1-cat2=0.033, pcat2-cat3=0.025).

The average system response is shown on FIG. 14D. For the first and second perturbation categories, the response is similar, although the oscillations last longer with EKC. There are more differences for the third category. The pulling perturbations for EKC are producing a larger deviation of the CoM (~4 cm instead of ~2 cm for the other conditions), because the full extension of the knee 3 was reached and lowered the control capability. This is only the case for EKC, because initially, the knee 3 was less flexed (the steady-state was not exactly the same), so there is less margin before the full extension is reached. It is also noticeable that even for the pushing perturbation, the hip 2 contribution is used. This is because the oscillations have a high amplitude and low damping, this is why the system also reaches the backward position and result in saturating the knee 3 angle in full extension and starts using the hip contribution.

3 Maximum Static Push and Pull Forces

The statistical analysis revealed a significant interaction between Controller and Perturbation Direction (p=0.024). The maximum pushing force for EKC was significantly higher (75.07±3.55 N) than for BKC (13.69±3.38 N, p=0.009). Although the maximum pulling force is also higher for EKC (27.91±6.46 N) than for BKC (13.26±1.15 N), the difference is not significant (p=0.101). EKC can sustain significantly higher static forces while the test-pilot is pushed forward than pull backward (p=0.006), while there is no significant effect of perturbation direction for BKC (p=0.92).

4 Object Lifting Perturbations

The results of this test are visible on FIG. 15. With BKC, the test-pilot could lift her arms but failed to lift the 2 kg barbells because she started falling forward before reaching the shoulder height, even though the ascent was slow. With EKC, the test-pilot could successfully lift the 2 kg, 4 kg and 6 kg barbells. The time for the pilot to perform each movement (lifting and lowering) is shown in Table 2.

TABLE 2

Time required to perform raising and lowering, for the barbell test. The starred value denotes failure (fall initiation) before completion.

| Condition | Raising time [s] | Lowering time [s] |
|---|---|---|
| BKC, 0 kg | 18 | 19 |
| BKC, 2 kg | 4* | N/A |
| EKC, 2 kg | 15 | 17 |
| EKC, 4 kg | 17 | 21 |
| EKC, 6 kg | 16 | 21 |

DISCUSSION

In spite of an oscillatory behavior, the controller according to the invention is practical because it only requires minimal sensing: the IMU in the trunk and the encoders in the joints. Joints torque sensors or load cells in the feet are not required. This allows to reduce the complexity and improve the reliability of the device.

Since TWIICE is rigidly position-controlled, a contribution from the legs of the user is not possible, so this strategy suits well the complete SCI patients who are not able to use their legs to keep balance (e.g. by applying torque to the ankle, or making a step). However, it would not be usable for exoskeletons providing partial assistance only. This case was addressed in references [9], [10] and [11].

The radius of the sole 4 could be lowered to decrease the effort to walk, since the optimal radius of the foot 5 should be 30% of the leg length according to reference [12]. The advised sole radius would then be close to 0.3 m, depending on the size of the subject. However, this would increase the thickness of the sole, and increase the knee 3 movements required to stabilize.

The balance can be controlled if the CoM stays within the [−50 mm 61 mm] range characterized in the previous section. For a typical light manipulation task (holding a 1 kg mass in front), it was measured in reference [13] that the CoM of the arms moves forward by 28 cm, which correspond to a shift of 28 mm of the whole body CoM, since the arms represent 10% of the total body mass according to the same reference. Such perturbation due to the movement of the arms can then be rejected appropriately by the controller.

In case the stability margin should be greater, it would be necessary to use trunk strategies.

In the simulation and with the actual hardware, the controller was able to achieve standing balance autonomously.

The contribution of the user, with the trunk or arms movements, is not required. Users should then be instructed not to try to balance by themselves, because the coupling between the user and exoskeleton action could lead to an unexpected behavior. This is however very difficult to predict and simulate, because this would require an accurate neuro-muscular model of the upper body. This is why the next step is to test the robustness of control when the exoskeleton is loaded with a user, which potentially brings unpredictable perturbations.

The present description is neither intended nor should it be construed as being representative of the full extent and scope of the present invention. The present invention is set forth in various levels of detail herein as well as in the attached drawings and in the detailed description of the invention and no limitation as to the scope of the present invention is intended by either the inclusion or non inclusion of elements, components, etc. Additional aspects of the present invention have become more readily apparent from the detailed description, particularly when taken together with the drawings.

Moreover, exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with an exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to embodiments of the present invention, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

REFERENCES

[1] A. R. C. Donati, S. Shokur, E. Morya, D. S. F. Campos, R. C. Moioli, C. M. Gitti, P. B. Augusto, S. Tripodi, C. G. Pires, G. A. Pereira, F. L. Brasil, S. Gallo, A. A. Lin, A. K. Takigami, M. A. Aratanha, S. Joshi, H. Bleuler, G. Cheng, A. Rudolph, and M. A. L. Nicolelis, "Long-Term Training with a Brain-Machine Interface-Based Gait Protocol Induces Partial Neurological Recovery in Paraplegic Patients," Scientific Reports, vol. 6, no. 1, September 2016.

[2] A. Schütz, "Robotic exoskeleton: For a better quality of life," December 2012.

[3] R. Griffin, T. Cobb, T. Craig, M. Daniel, N. van Dijk, J. Gines, K. Kramer, S. Shah, O. Siebinga, J. Smith, and P. Neuhaus, "Stepping Forward with Exoskeletons: Team IHMC's Design and Approach in the 2016 Cybathlon," IEEE Robotics & Automation Magazine, vol. 24, no. 4, pp. 66-74, December 2017.

[4] T. Vouga, R. Baud, J. Fasola, M. Bouri, and H. Bleuler, "TWIICE—A lightweight lower-limb exoskeleton for complete paraplegics," in International Conference on Rehabilitation Robotics (ICORR). IEEE, 2017, pp. 1639-1645.

[5] S. O. Schrade, K. Datwyler, M. StUcheli, K. Studer, D. A. Türk, M. Meboldt, R. Gassert, and O. Lambercy, "Development of VariLeg, an exoskeleton with variable stiffness actuation: First results and user evaluation from the CYBATHLON 2016," Journal of NeuroEngineering and Rehabilitation, vol. 15, no. 1, December 2018.

[6] J. Fasola, T. Vouga, R. Baud, M. Bouri, and H. Bleuler, "Balance control strategies during standing in a locked-ankle passive exoskeleton," in International Conference on Rehabilitation Robotics (ICORR), Toronto, Canada, 2019.

[7] D. Winter, "Human balance and posture control during standing and walking," Gait & Posture, vol. 3, no. 4, pp. 193-214, December 1995.

[8] C. E. Clauser, J. T. McConville, and J. W. Young, "WEIGHT, VOLUME, AND CENTER OF MASS OF SEGMENTS OF THE HUMAN BODY:" Defense Technical Information Center, Fort Belvoir, V A, Tech. Rep., August 1969.

[9] I. Farkhatdinov, J. Ebert, G. van Oort, M. Vlutters, E. van Asseldonk, and E. Burdet, "Assisting Human Balance in Standing With a Robotic Exoskeleton," IEEE Robotics and Automation Letters, vol. 4, no. 2, pp. 414-421, April 2019.

[10] V. Rajasekaran, J. Aranda, A. Casals, and J. L. Pons, "An adaptive control strategy for postural stability using a wearable robot," Robotics and Autonomous Systems, vol. 73, pp. 16-23, November 2015.

[11] A. Emmens, E. van Asseldonk, M. Masciullo, M. Arquilla, I. Pisotta, N. L. Tagliamonte, F. Tamburella, M. Molinari, and H. van der Kooij, "Improving the Standing Balance of Paraplegics through the Use of a Wearable Exoskeleton," in 2018 7th IEEE International Conference on Biomedical Robotics and Biomechatronics (Biorob). Enschede: IEEE, August 2018, pp. 707-712.

[12] P. G. Adamczyk, S. H. Collins, and A. D. Kuo, "The advantages of a rolling foot in human walking," Journal of Experimental Biology, vol. 209, no. 20, pp. 3953-3963, October 2006.

[13] A. E. Patla, M. G. Ishac, and D. A. Winter, "Anticipatory control of center of mass and joint stability during voluntary arm movement from a standing posture: Interplay between active and passive control," Experimental Brain Research, vol. 143, no. 3, pp. 318-327, April 2002.

[14] O. Harib et al., "Feedback Control of an Exoskeleton for Paraplegics: Toward Robustly Stable, Hands-Free Dynamic Walking," IEEE Control Systems Magazine, vol. 38, no. 6, pp. 61-87, December 2018.

[15] A. R. Emmens, E. H. F. van Asseldonk, and H. van der Kooij, "Effects of a powered ankle-foot orthosis on perturbed standing balance," J Neuroeng Rehabil, vol. 15, no. 1, p. 50, 18 2018.

[16] Rex Bionics

[17] Baud, R., J. Fasola, T. Vouga, A. Ijspeert, and M. Bouri. 2019. "Bio-Inspired standing Balance Controller for a Full-Mobilization Exoskeleton." In 2019 IEEE 16th International Conference on Rehabilitation Robotics (ICORR), 849-54.

[18] Fasola, Jemina, Tristan Vouga, Romain Baud, Hannes Bleuler, and Mohamed Bouri. 2019. "Balance Control Strategies during Standing in a Locked-Ankle Passive Exoskeleton." IEEE . . . International Conference on Rehabilitation Robotics: [Proceedings] 2019:593-98.

[19] Fang, Y., L. R. Morse, N. Nguyen, N. G. Tsantes, and K. L. Troy. 2017. "Anthropometric and Biomechanical Characteristics of Body Segments in Persons with Spinal Cord Injury." Journal of Biomechanics 55 (April): 11-17.

The invention claimed is:

1. A method of performing automatic standing balance of a user on a ground, said user having a torso and being in an exoskeleton with at least a foot with a sole and using at least two actuated degrees of freedom, wherein a controller uses information provided from sensors to produce corrective movements in the actuated degrees of freedom, wherein an estimation of a center of mass of the system comprising the user and the exoskeleton is made and the controller applies corrective measures on the actuated degrees of freedom to influence a position of the center of mass with respect to a center of pressure with the ground on which the exoskeleton is standing.

2. The method as defined in claim 1, wherein the two actuated degrees of freedom are a knee and a hip flexion/extension.

3. The method as defined in claim 1, wherein the corrective measures are meant to modify a position of the center of pressure, or to modify the conformation of the exoskeleton in space, or to apply a corrective torque by accelerating the torso of the user in one or the other direction.

4. The method as defined in claim 1, wherein said method uses position controlled joints.

5. The method as defined in claim 1, wherein the sole of the foot is curved with a curvature and said method exploits the curvature of the sole of the foot of the exoskeleton and a rolling to change a position of a point of contact with the ground.

6. The method as defined in claim 1, wherein the sole of the foot is flat and has a variable stiffness profile such that changing a foot angle with respect to the ground moves the center of pressure fore-aft.

7. The method as defined in claim 1, wherein the foot sole is a soft flat foot sole such that changing the foot angle with respect to the ground also moves the center of pressure fore-aft.

8. The method as defined in claim 1, wherein said method uses a knee flexion to influence the position of the center of pressure (CoP), through an orientation of the foot of the exoskeleton.

9. The method as defined in claim 1, wherein an inertial measurement unit (IMU) is located in the foot of the exoskeleton.

10. A device using the method as defined in claim 1 to perform automatic standing balance of the user.

11. The device as defined in claim 10, wherein said device is the exoskeleton.

12. The device as defined in claim 11, wherein said exoskeleton comprises at least two actuated degrees of freedom formed by joints.

13. The device as defined in claim 12, wherein said joints are position-controlled joints.

14. The device as defined in claim 11, wherein the foot sole is flat and has a variable stiffness profile such that that changing the foot angle with respect to the ground moves the center of pressure fore-aft.

15. The device as defined in claim 11, wherein the foot sole is a soft flat foot sole such that changing the foot angle with respect to the ground also moves the center of pressure fore-aft.

16. The device as defined in claim 10, wherein said device comprises an inertial measurement unit (IMU).

17. The device as defined in claim 16, wherein said inertial measurement unit is located in the foot of the device.

* * * * *